(12) United States Patent
Watkins

(10) Patent No.: US 8,573,671 B2
(45) Date of Patent: Nov. 5, 2013

(54) TOOLBOX SYSTEM FOR VEHICLES HAVING FLARED FENDERS

(76) Inventor: Mickey L. Watkins, Fresno, CA (US)

(*) Notice: Subject to any disclaimer, the term of this patent is extended or adjusted under 35 U.S.C. 154(b) by 0 days.

(21) Appl. No.: 13/080,606

(22) Filed: Apr. 5, 2011

(65) Prior Publication Data

US 2012/0256438 A1 Oct. 11, 2012

(51) Int. Cl.
*B60R 9/02* (2006.01)

(52) U.S. Cl.
USPC .......................................... 296/37.8

(58) Field of Classification Search
USPC .......................................... 296/37.6
See application file for complete search history.

(56) References Cited

U.S. PATENT DOCUMENTS

| | | | | |
|---|---|---|---|---|
| 2,722,352 | A * | 11/1955 | Dehnel | 224/404 |
| 2,978,153 | A * | 4/1961 | Brindle | 224/541 |
| 3,326,595 | A * | 6/1967 | Ogilvie | 296/37.6 |
| 4,135,761 | A * | 1/1979 | Ward | 296/37.6 |
| 5,368,357 | A * | 11/1994 | Kalis et al. | 296/183.1 |
| 5,615,922 | A * | 4/1997 | Blanchard | 296/37.6 |
| D382,834 | S * | 8/1997 | Perlman et al. | D12/98 |
| D388,756 | S * | 1/1998 | Perlman et al. | D12/196 |
| 5,706,991 | A * | 1/1998 | Stewart | 224/539 |
| 6,081,186 | A * | 6/2000 | Adams | 340/426.28 |
| 6,139,081 | A * | 10/2000 | Lemieux | 296/37.7 |
| 6,485,077 | B1 * | 11/2002 | Foster et al. | 296/37.1 |
| 6,695,375 | B1 | 2/2004 | May | |
| 6,913,304 | B1 | 7/2005 | Sweet | |
| 6,923,354 | B2 | 8/2005 | Axelson | |
| 6,941,654 | B1 * | 9/2005 | Sears | 29/897.2 |
| 6,955,385 | B1 * | 10/2005 | Boyer | 296/37.6 |
| 7,182,177 | B1 * | 2/2007 | Simnacher | 187/211 |
| 7,222,905 | B2 * | 5/2007 | Jaeck | 296/1.07 |
| 7,431,368 | B2 * | 10/2008 | Henderson et al. | 296/37.6 |
| 7,461,884 | B2 * | 12/2008 | Clare et al. | 296/37.6 |
| 7,562,925 | B2 * | 7/2009 | Henderson et al. | 296/37.6 |
| 7,686,365 | B2 * | 3/2010 | Thelen et al. | 296/37.6 |
| 7,748,764 | B2 * | 7/2010 | Frankham | 296/37.6 |
| 7,931,324 | B2 * | 4/2011 | Henderson et al. | 296/37.1 |
| 2008/0231066 | A1 * | 9/2008 | Harrell | 296/37.6 |
| 2009/0058121 | A1 * | 3/2009 | Frankham | 296/37.6 |

* cited by examiner

*Primary Examiner* — H Gutman
(74) *Attorney, Agent, or Firm* — Richard A. Ryan

(57) ABSTRACT

A toolbox system for vehicles having a flared section with a fender flare extending outwardly from a side of the vehicle, such as dually pickup trucks and the like. The toolbox system has one or more compartments disposed in the flared section and a door, drawer or other mechanism associated with each of the compartments to allow access to a chamber enclosed by the compartment and to close the compartment. Tools, equipment and other materials can be safely and securely placed in the chamber for transport and storage. Preferably, the contour of the door or drawer corresponds to the contour of the outer wall of the fender flare to substantially maintain the original configuration of the flared section. The toolbox system allows the user to transport and store materials in a manner that protects the materials, does not utilize the rear cargo area and maintains the attractiveness of the vehicle.

20 Claims, 6 Drawing Sheets

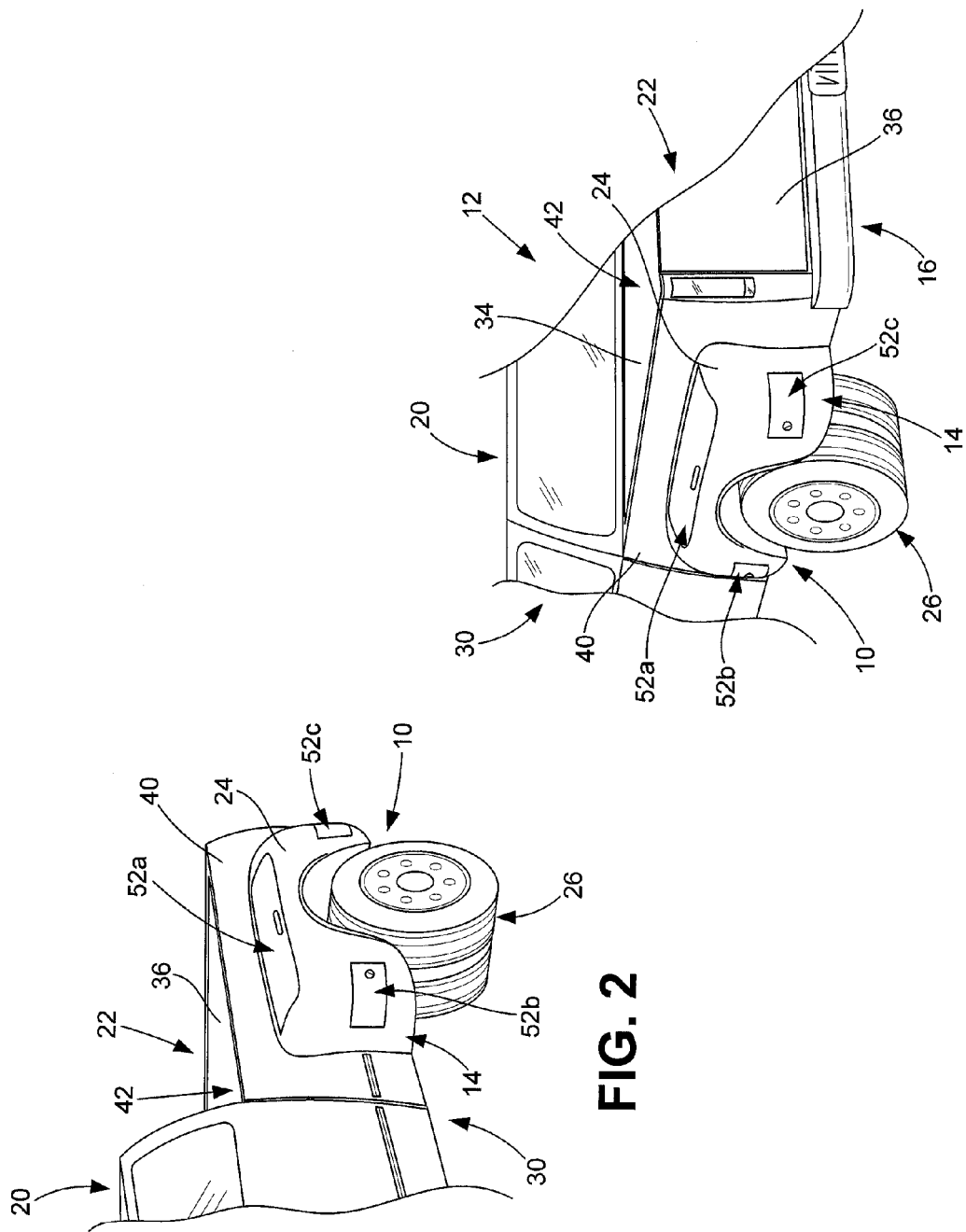

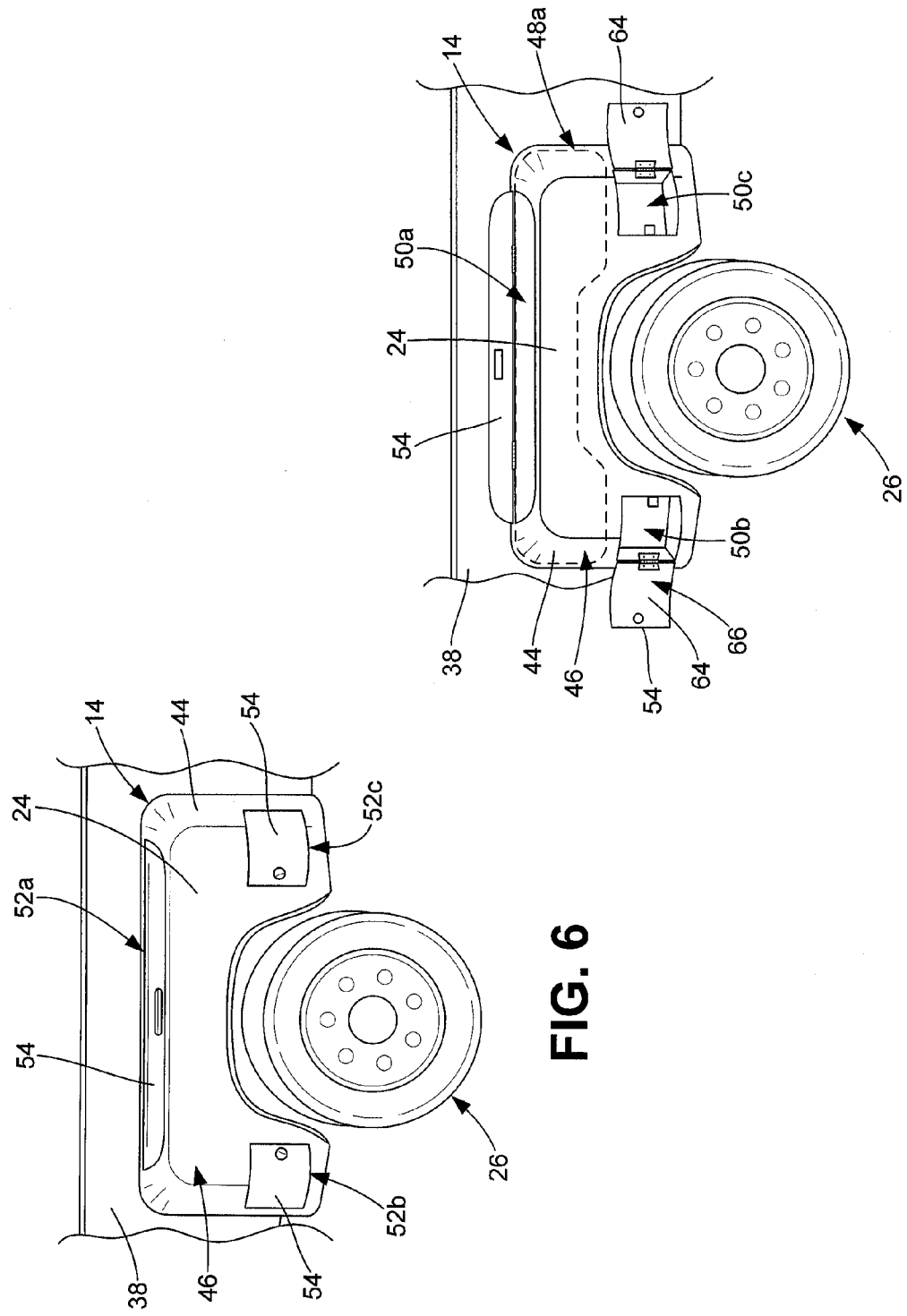

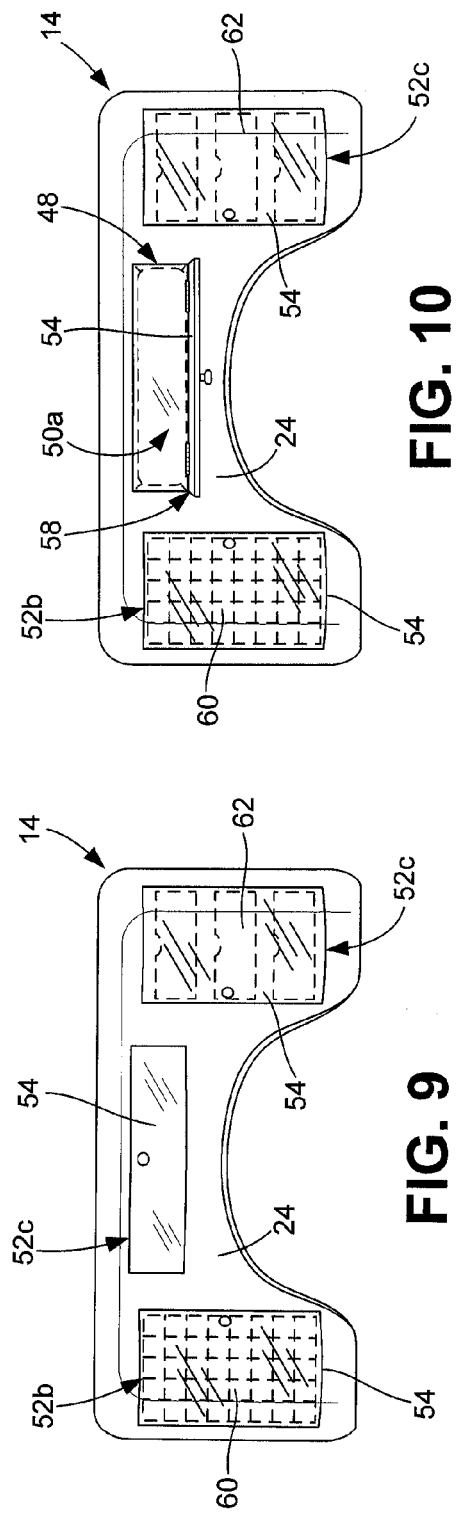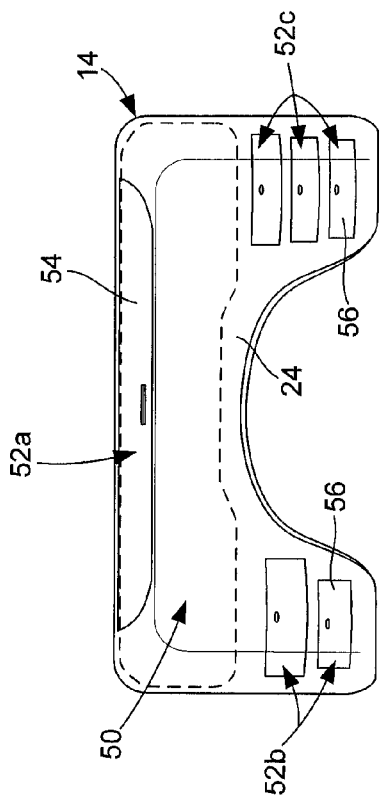

TOOLBOX SYSTEM FOR VEHICLES HAVING FLARED FENDERS

CROSS-REFERENCE TO RELATED APPLICATIONS

None.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The present invention relates generally to toolboxes and toolbox systems that are transported by and utilized with a vehicle, such as pickup trucks and the like. In particular, the present invention relates to such toolboxes and toolbox systems that are fixedly attached to or incorporated into the vehicle so as to be part of the vehicle. Even more particularly, the present invention relates to such toolboxes and toolbox systems that are utilized with vehicles having a flared fender over one or more wheels of the vehicle and having a toolbox incorporated into the flared fender.

B. Background

Many people utilize pickup trucks and similarly configured vehicles for transporting work supplies, sporting equipment, groceries and a wide variety of other materials. Pickup trucks are generally distinguished from other vehicles by having a bed portion positioned rearward of the driver and passenger area of the vehicle, which area is commonly referred to as the cab portion of the vehicle. The bed portion has a horizontally disposed load bearing floor or bed surface that is bounded by a front wall, a rear wall or tailgate and a pair of opposing sidewalls, which collectively define a rear cargo area behind the cab. Although the passenger and rear cargo areas of pickups are generally suitable for safely carrying a variety of different types of materials, many people prefer to utilize a toolbox or like container that is built into or attached to the bed of the pickup to carry some or all of these materials. Use of an externally positioned toolbox frees up space inside the cab of the vehicle for passengers and avoids the materials damaging or at least fouling the seats and other interior areas of the cab. Use of a toolbox also allows the user of the vehicle to carry his or her tools, equipment and other materials in the rear cargo area of the vehicle with significantly less risk of damage to these materials or the vehicle that could result from the materials being loosely carried in the rear cargo area. The toolboxes utilized with pickup trucks and the like typically have a locking mechanism that allows the user of the vehicle to leave his or her tools, equipment and other materials with the vehicle overnight or when the vehicle is otherwise not in use. The ability to secure these materials in a toolbox that is fixedly attached to a vehicle, such as a pickup truck, is particularly important for persons in the trades, such as carpenters, plumbers, electricians and the like, who would otherwise have to place the vehicle indoors or load the materials into the vehicle every time he or she needs them for work to prevent theft of the materials. In addition, once the vehicle is at a job site or other work location, use of a toolbox mounted on a vehicle allows the user to access the toolbox as needed to retrieve tools, equipment or other materials therefrom that will be used at the work location and then store these materials inside the toolbox when he or she is finished.

The prior art discloses a wide variety of toolboxes that are utilized with pickup trucks and similarly configured vehicles. The most commonly utilized type of pickup truck toolbox is configured to extend across the bed of the pickup truck from one sidewall to the other, resting on and generally being secured to the bedrail at the top of each sidewall. These toolboxes are placed in the rear cargo area, usually positioned immediately behind the cab and adjacent the front wall of the bed portion. As a result, this type of toolbox is commonly referred to as a "behind-the-cab" toolbox. The typical "behind-the-cab" toolbox has a bottom wall, sidewalls and a top wall or lid that defines one or more storage compartments inside the toolbox that are typically accessed, to retrieve tools, equipment and other materials stored therein, by raising one or more sections of the lid. The design of this type of toolbox is such that it is intended that most people can reach at least a majority of the materials inside the storage compartments while standing along the side of the vehicle. However, as is commonly known, in practical use the ability to reach everything in the storage compartment of the toolbox depends on the height of the pickup truck bedrail and, therefore the lid of the toolbox, off the ground and the height and arm reach of the person accessing the storage compartments. For many people, being able to reach everything in the toolbox while standing on the ground along the side of the vehicle can be somewhat difficult or nearly impossible, particularly because the compartments inside the toolbox typically extend down to or just above the bed surface. If the desired space or materials cannot be reached from outside the pickup truck, the user has to either stand on a stool to fully reach inside the toolbox or climb into the bed portion of the vehicle and access the materials from inside the rear cargo area. Another problem with the "behind-the-cab" type of toolbox is that it typically prevents use of bed lids or tonneau covers, which are popular accessories for pickup trucks, to cover the otherwise open rear cargo area. The "behind-the-cab" toolboxes also generally prevent use of bed shells, campers and many overhead rack systems.

A number of prior art patents describe different configurations for toolboxes that attach to and are utilized with pickup trucks. For instance, the prior art includes toolbox and toolbox assemblies that attach a toolbox onto or just above the bed surface of the pickup truck at or near the rear wall or tailgate of the bed so the storage compartments inside the toolbox can be accessed from the rear of the pickup truck, without getting into the rear cargo area, when the tailgate is down or swung out open, as exemplified by U.S. Pat. No. 6,695,375 to May and U.S. Pat. No. 6,923,354 to Axelson. The toolboxes of these patents have slideably mounted drawers that pull outward towards the rear of the vehicle and are configured with a sufficiently low profile such that the top of the toolbox is below the bedrails, thereby allowing use of tonneau tops, bed shells campers and overhead racks with the pickup truck over the open rear cargo area. U.S. Pat. No. 6,913,304 to Sweet discloses a dual-compartment storage apparatus that comprises a pair of storage compartments that are suspended by one of the sidewalls and positioned inside the rear cargo area of the bed portion of the pickup truck. Access to the interior of the storage compartments is achieved from the side of the vehicle along the sidewalls of the bed portion. The toolboxes of the above-described patents and other prior art, as well as the commonly utilized "behind-the-cab" type of toolboxes, interfere with and block the space inside the rear cargo area that is otherwise utilized to carry lumber, pipe and other materials that are commonly used by the person having a need to carry tools, equipment and other materials inside the toolbox. In addition, use of many of the prior art toolboxes interfere with and even prevent use of fifth wheel trailer apparatuses and other equipment that are often desired to be utilized with pickup trucks and the like. As such, many people are forced to choose between having a toolbox fixed to the bed portion of the vehicle or being able to fully utilize the rear cargo area thereof.

One type of specialty truck, commonly referred to as a utility truck, has toolboxes and like storage compartments built into the sidewalls of the bed of the truck. Typically, utility trucks are generally configured somewhat similar to a pickup truck except the sidewalls of the utility truck are utilized for storage, with the storage areas facing outwardly from the sidewalls so access thereto may be obtained from outside the side of the utility truck. The storage compartments, which may comprise cabinets closed with doors, drawers which pull out and like storage areas, extend inward towards the center of the bed portion of the utility truck. Typically, the configuration of a utility truck results in a significant portion of the bed being utilized as part of the storage. Although quite functional for work, utility trucks are not usually considered attractive and are not utilized as everyday-type vehicles.

One type of pickup truck and like vehicles has a pair of rear wheels on each side of the vehicle, instead of only one wheel on each side, so that the vehicle can carry heavier loads and provide improved performance in certain situations. These vehicles are commonly referred to as dually pickups or just duallies. Because the second or outside wheel would extend outwardly from the side of the vehicle, these vehicles are typically provided with a flared section that is defined by a fender flare which extends outwardly from the side of the vehicle and is in spaced relation above the tire of the outward rear wheel to improve the appearance and functionality of the vehicle. As with all fenders, the flared fender of the flared section defines a wheel well between the bottom of the flared fender and the top of the tire. Typically, the flared fender is flared outward from the side of the vehicle in front of, behind and above the wheel well area, creating space between the frame of the vehicle and the outer wall of the flared fender that is not presently utilized by dually trucks, including dually trucks that are also configured as a utility truck. In the past, the flared section of the vehicle was usually a separate flare component, often made out of fiberglass or like material, that was bolted onto or otherwise attached to the sides of the vehicle. Presently, some manufacturers manufacture the flared section of the vehicle integrally with the side of the vehicle.

What is needed is an improved toolbox system for vehicles that have flared fenders, such as dually pickup trucks and the like, that allows the user easy access to one or more storage compartments inside the toolbox and which does not utilize or interfere with use of the rear cargo area or with the use of tonneau tops, bed shells, campers and rack systems. The improved toolbox system should provide one or more storage compartments that can be easily accessed by the user thereof from outside the vehicle such that he or she does not have to utilize a stool or climb inside the rear cargo area to reach all areas of the storage compartments and the materials therein.

SUMMARY OF THE INVENTION

The toolbox system for vehicles having flared fenders of the present invention provides the benefits and solves the problems identified above. That is to say, the present invention discloses an improved toolbox system that utilizes the heretofore not utilized space between the frame of the vehicle and the outer wall of a flared fender for storage. The toolbox system of the present invention provides one or more storage compartments in the flared fenders of a dually truck or other vehicle that utilizes available space in a manner which does not interfere with or prevent full use of a pickup truck bed or the like. The toolbox system of the present invention provides easy access to the storage areas of the toolbox to a person standing along the side of the vehicle, generally without regard to the person's height and/or arm reach. The present invention allows a person to store tools, equipment and other materials in one or more storage compartments built into the flared fender of a vehicle, such as a dually truck, for easy access to those materials and without interfering with use of the rear cargo area for tonneau tops, bed shells, campers and overhead rack systems. Preferably, the toolbox system utilizes a locking mechanism to prevent unauthorized access to materials that are stored therein. A preferred embodiment of the toolbox system of the present invention utilizes storage areas that are defined on the exterior of the vehicle by the outer wall of the flared section, with access to the storage areas obtained by opening doors or pulling out drawers that are configured in corresponding relation to the contour of the fender flare. As such, the toolbox system of the present invention provides convenient, easily accessed storage for vehicles having flared fenders that does not deter from the attractiveness of the vehicle.

In a primary embodiment of the present invention, the toolbox system generally comprises a vehicle having a flared section on a side of the vehicle with the flared section having a fender flare that extends outward from the side of the vehicle and disposed in spaced apart relation to one or more wheels of the vehicle, one or more compartments that are disposed in the flared section with each of the compartments enclosing one or more chambers and a door, drawer or other accessing means associated with each of the compartments for allowing the user to access the chambers from the side of the vehicle through a wall of the fender flare. Preferably, the wall of the fender flare has a wall contour shape that is in corresponding relation to the contour shape of an outer member of the door, drawer or other accessing means so the outer member substantially blends in with the flared section of the vehicle. The toolbox system of the present invention is particularly useful for vehicles having a bed portion with an upwardly disposed bed surface bounded by a front wall, rear wall, first sidewall and a second sidewall that defines a rear cargo area, such as dually pickup trucks and the like. For such vehicles, the fender flare typically extends outwardly of one of the first sidewall and the second sidewall and at least one of the compartments is disposed generally below the sidewall. In one configuration, the flared section defines a flare space disposed between the wall of the fender flare and a wheel well wall of a wheel well, which is usually located in the rear cargo area of the vehicle, with at least one of the compartments being disposed in the flare space. In another embodiment, the toolbox system has a plurality of compartments in the flared section and the accessing means for at least one of the compartments being a door or a drawer. In another embodiment, at least one of the accessing means is a door that pivots downward to define a shelf on which tools, equipment and/or other materials can be placed.

Accordingly, the primary aspect of the present invention is to provide an improved toolbox system that has the advantages discussed above and which overcomes the disadvantages and limitations associated with prior art toolboxes and toolbox systems.

It is an important aspect of the present invention to provide a toolbox system for vehicles having flared fenders that beneficially utilizes the heretofore not utilized space between the outer wall of the flared fenders and the frame of the vehicle for one or more storage compartments.

It is also an important aspect of the present invention to provide a toolbox system for vehicles having flared fenders that provides easy access for a person standing along the side of the vehicle to materials stored in one or more storage compartments that are built into the space between the outer wall of the flared fender and the frame of the vehicle.

It is also an important aspect of the present invention to provide a toolbox system that utilizes the space between the outer wall of a flared fender for one or more storage compartments in a manner that allows storage of materials in the toolbox and easy access to those materials without interfering with full use of the rear cargo area for tonneau tops, bed shells, campers, overhead racks and the like.

It is also an important aspect of the present invention to provide a toolbox system for vehicles having flared fenders that utilizes the space between the outer wall of the flared fenders for storage compartments in a manner that does not detract or at least not substantially detract from the attractiveness of the vehicle.

The above and other aspects and advantages of the present invention are explained in greater detail by reference to the attached figures and the description of the preferred embodiment which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention:

FIG. 2 is a front perspective view of the rear portion of the dually pickup of FIG. 1 particularly showing the flared section thereof and the toolbox system of FIG. 1;

FIG. 3 is a rear perspective view of the rear portion of the dually pickup of FIG. 1 particularly showing the flared section thereof and the toolbox system of FIG. 1;

FIG. 6 is an isolated side view of the flared section of the dually pickup truck of FIG. 1 showing the toolbox system of FIG. 1;

FIG. 7 is an isolated side view of the flared section of FIG. 6 showing the doors of the storage compartments in their open position;

FIG. 9 is an isolated side view of a flared section of a vehicle showing a third embodiment of the toolbox system of the present invention;

FIG. 10 is the isolated side view of the flared section and toolbox system of FIG. 9 showing the top door of the toolbox pivoted downward to form a shelf or platform for use therewith; and FIG. 11 is an isolated side view of a flared section of a vehicle showing a fourth embodiment of the toolbox system of the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed text and drawings are merely illustrative of one or more preferred embodiments and, as such, disclose one or more different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein show and discuss certain shapes and configurations for the flared sections and the various compartments of the toolbox system used therewith, those skilled in the art will understand that this is merely for purposes of simplifying this disclosure and that the present invention is not so limited.

Figure 1:
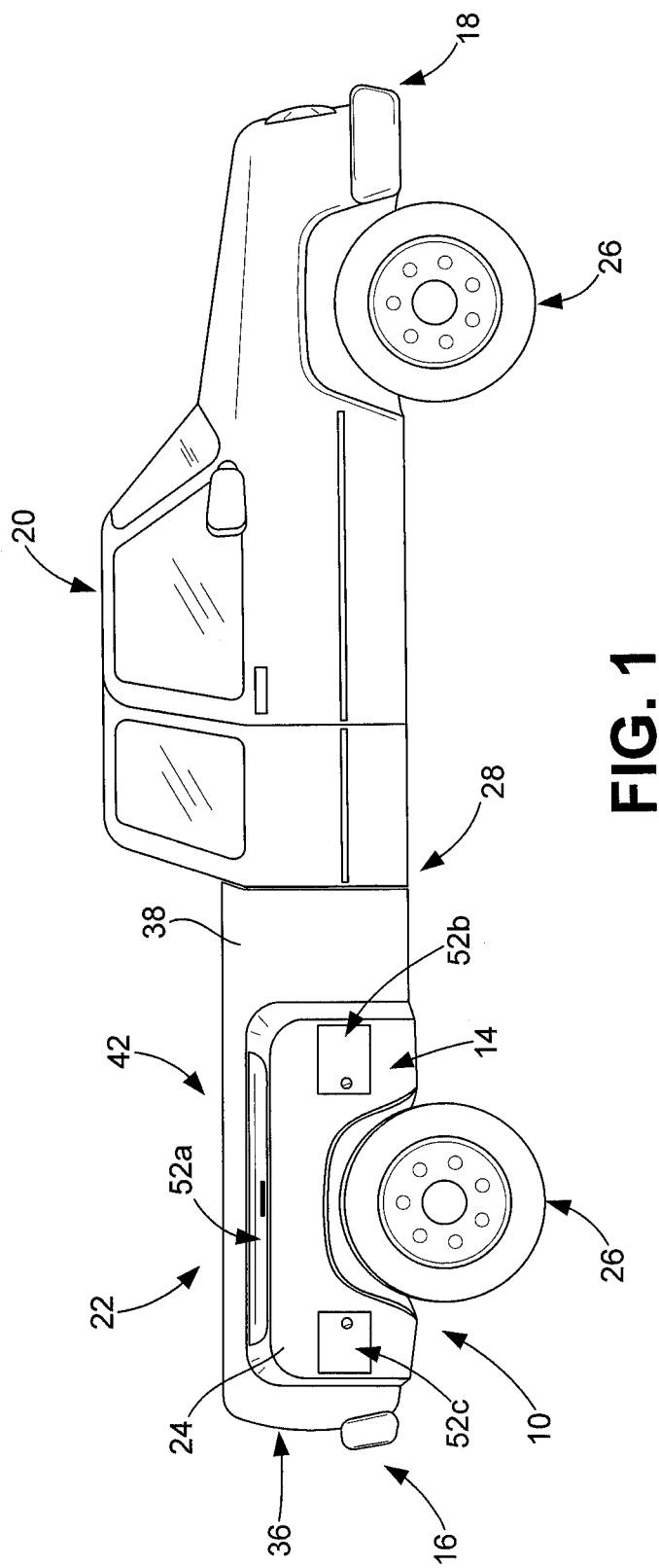
FIG. 1 is a side view of a dually pickup truck having a toolbox system configured according to a first embodiment of the present invention.
Figure 4:
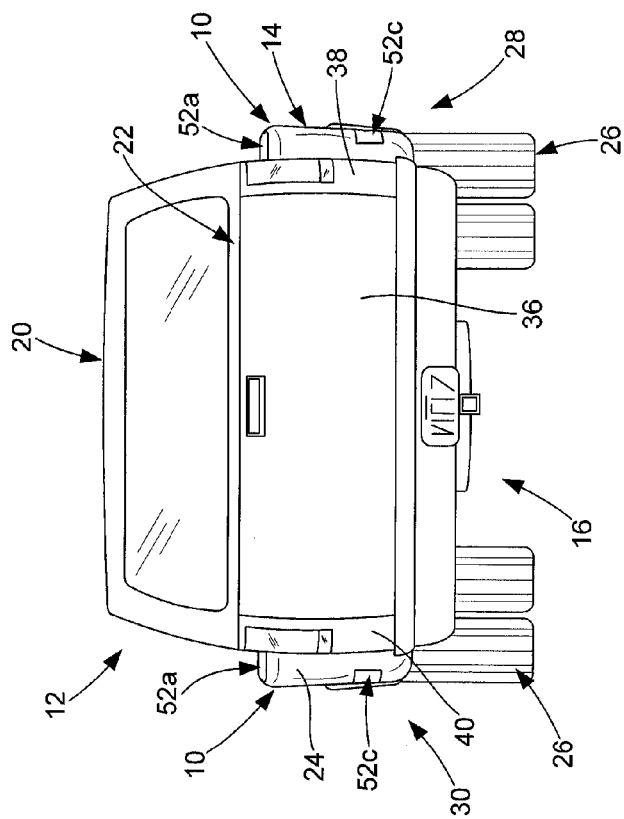
FIG. 4 is a back view of the dually pickup truck of FIG. 1 showing the toolbox system of FIG. 1.

A toolbox system that is configured pursuant to various embodiments of the present invention is shown generally as 10 in FIGS. 1 through 11. As set forth in more detail below, the toolbox system 10 of the present invention is configured to be utilized with a vehicle 12, such as a pickup truck or the like, as best shown in FIGS. 1 through 4, having a flared section 14 towards the back end 16 of the vehicle 12 having a front end 18. The vehicle has a cab portion 20 towards the front end 18 and a bed portion 22 toward the back end 16 and immediately rearward of the cab portion 20, as shown in FIG. 1. The flared section 14 comprises a fender flare 24 that is disposed in spaced apart relation to one or more wheels 26, typically above, in front of and behind the wheels 26 of vehicle 12 (for purposes of the present disclosure the term wheels 26 includes both the wheel component and the tire attached thereto). Typically, though not exclusively, flared section 14 will only be disposed over the rear wheels 26. In the embodiment shown in the accompanying figures, the vehicle 12 is a dually pickup truck having two rear wheels 26 with a flared section 14 associated with each rear wheel 26 of vehicle 12, as best shown in FIGS. 2 through 4. As shown in the figures, the fender flare 24 of flared section 14 extends outwardly from the respective sides, shown as first or right side 28 and second or left side 30 in FIGS. 1 through 4, of vehicle 12. As with other pickup trucks, the bed portion 22 of vehicle 12 comprises a horizontally disposed load bearing floor or bed surface 32 that is bounded by a front wall 34, a rear wall 36 (which is typically configured as a tailgate that pivots downward or to one side to open) and a pair of opposing sidewalls, namely first sidewall 38 at first side 28 and second sidewall 40 at second side 30, which collectively define a rear cargo area 42 behind the cab portion 20 of vehicle 12.

Figure 5:
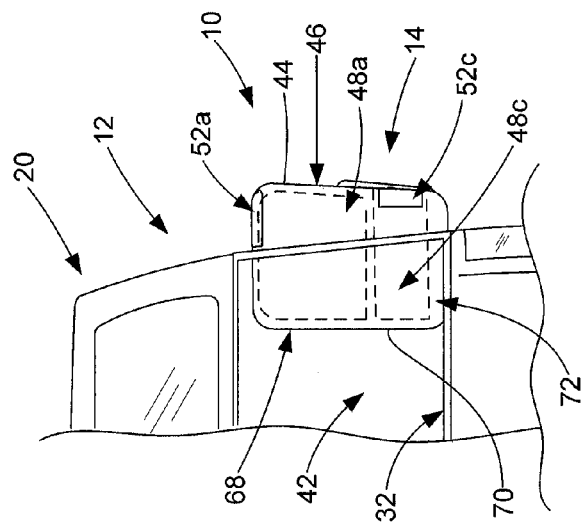
FIG. 5 is an isolated review view of the toolbox system and dually pickup truck of FIG. 1, with the pickup truck shown without the tailgate to better illustrate the wheel well wall inside the rear cargo area.

Existing vehicles 12 have fender flares 24 with a wall 44 that has a wall contour shape 46 which defines the flare configuration for the fender flare 24 as best shown in FIG. 5. As well known in the art, wall contour shape 46 of wall 44 of fender flare 24 can, and usually does, vary significantly from one vehicle 12 to another, particularly for different manufactures, in order to provide different aesthetics for their respective flared sections 14. The wall 44 of existing fender flares 24 are made out of wide variety of different materials, with fiberglass, composite and sheet metal likely being the most common materials. The toolbox system 10 of the present invention is intended to be adaptable for existing wall contour shapes 46 and made out of the same materials. If desired, however, the toolbox system 10 can utilize newly configured wall contour shapes 46, such as those selected to more fully utilize the benefits of the present invention, and be made out of materials that are different than utilized for existing flared sections 14. Likewise, the flared section 14 portion of the toolbox system 10 can be made as a separate component that is bolted-on or otherwise fixedly attached to one or more sides 28/30, typically both sides 28/30, or be manufactured as integral with the sides 28/30, usually the sidewalls 38/40 respectively, of vehicle 12. In either configuration, the addition of the toolbox system 10 to vehicle 12 is intended to enhance the functionality of the vehicle 12 without detracting or at least without significantly detracting from the "lines" of the vehicle 12 that are selected for their appearance and, as applicable, their functionality with regard to vehicle wind resistance, spacing for any anticipated movement of wheels 26 during operation of vehicle 12 and like considerations.

For use to transport and store tools, equipment and other materials, the toolbox system 10 comprises one or more compartments 48 disposed in one or more of the flared sections 14 of vehicle 12, as best shown in FIGS. 5 through 11. Typically, each of the flared sections 14 toward the back end 16 of vehicle 12 will each have at least one compartment 48 disposed therein. Each compartment 48 encloses one or more chambers 50 in which the tools, equipment and/or other materials are received. As shown in the figures, typically at least one of the compartments 48 will be positioned beneath the sidewall 38/40 of the bed portion 22 of the vehicle 12. Associated with each compartment 48 is an accessing means, identified collectively as 52, for accessing the one or more chambers 50 enclosed by the respective compartment 48 so the user of the toolbox system 10 can place materials in the chambers 50 and remove them therefrom when he or she desires to access the materials for use or for other purposes. The figures show use of three accessing means 52, namely 52a, 52b and 52c, for the three compartments utilized in the exemplary toolbox systems 10. As will be readily apparent to those skilled in the art, a toolbox system 10 may comprise one or more of such compartments 48 and accessing means 52 in any particular flared section 14. Preferably, each of the accessing means 52 are sized and configured to allow the user to easily access the entire contents of the respective chambers 50 inside compartments 48 from the sides 28/30 of vehicle 12 so the user does not have to enter the rear cargo area 42 for such access.

Figure 8:
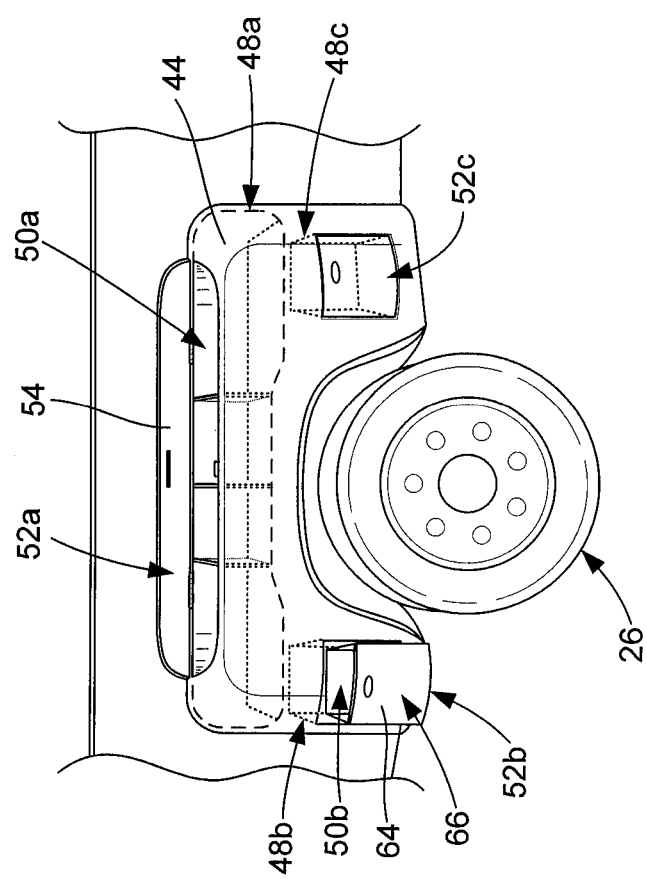
FIG. 8 is an isolated side view of a flared section of a vehicle showing a second embodiment of the toolbox system of the present invention with the top door and bottom left drawer shown in their open position.

For access to the chamber 50 in a particular compartment 48, the accessing means 52 can be one of a number of commonly utilized configurations that close the chamber 50 when it is not in use, such as when the vehicle 12 is moving or parked (e.g., closed up at night), but allow the user to obtain access to the compartment 48 when he or she needs to place materials inside the chamber 50 or remove materials therefrom. In the embodiment shown in FIGS. 1 through 7, each of the accessing means 52a, 52b and 52c are doors 54 that are pivotally attached to fender flare 24 so as to pivot between the closed position (shown in FIGS. 1-6) and the open position (shown in FIG. 7). In the embodiment of FIG. 8 the accessing means 52a is a door 54 that pivots upward to open and accessing means 52b and 52c are drawers 56 that are slideably engaged with the fender flare 24 to allow the user to pull the drawer 56 outward to the open position, as shown for 52b, and push it in for the closed position, as shown for 52c. FIG. 8 also shows the use of multiple chambers 50 inside compartment 48a. The embodiments of FIGS. 9 and 10 show the use of a door 54 for accessing means 52a that folds downward to a substantially horizontal position, as shown in FIG. 10, to define a shelf or platform, shown as 58, on which materials, including tools, equipment and other materials, can be placed. Other accessing means 52 can also be configured to define a shelf 58. These figures also show use of a door 54 for both accessing means 52b and 52c, with the door 54 of accessing means 52b enclosing a plurality of cubbyholes 60 that can be utilized to transport and store small items and the door 54 for accessing means 52c enclosing a plurality of internally disposed, slideable drawers 62. The embodiment of FIG. 11 shows use of a door 54 for the accessing means 52a and a plurality of drawers 56 for each of accessing means 52b and 52c. The mechanisms to achieve the movement of the doors 54, drawers 56, platform 58 and internal drawers 62 are generally well known in the art of toolboxes, cabinets and like apparatuses, and include items such as hinges, sliding apparatuses and the like. In addition, doors 54, drawers 56 and other accessing means 52 can include latching mechanisms, which are also well known in the art, that are configured to ensure the accessing means 52 securely closes.

In a preferred embodiment, each of the doors 54 and drawers 56 have an outer member 64 that is disposed at the wall 44 of fender flare 24 such that the surface of fender flare 24 is generally smooth along the transition from the wall 44 to the outer member 64. Preferably, outer member 64 of the doors 54 and drawers 56 each have a member contour shape 66 that is in corresponding relation to the wall contour shape 46 of the wall 44 of fender flares 24 such that the outward appearance of the outer member 64 of the doors 54 and drawers 56 is attractive (i.e., the outer members 64 nearly or as nearly as possible effectively "disappear" into the wall 44 of fender flare 24). The outer members 64 of doors 54 and drawers 56 are attached to or integral with the remaining components, respectively, thereof. As is necessary and/or desired for utilization of the toolbox system 10 of the present invention, the doors 54 and drawers 56 have handles, recesses or other mechanisms to assist the user with access to the chambers 50 disposed inside the compartments 48 behind the outer members 64. In addition, the various doors 54 and drawers 56, or other types of accessing means 52 used with the toolbox system 10, either each have or are operatively interconnected with a locking mechanism that allows the user to lock the accessing means 52 in the closed condition to prevent unauthorized access to the tools, equipment and other materials that are stored therein. The configuration, operation and use of such locking mechanisms are generally well known in the art.

In a preferred embodiment of the toolbox system 10 of the present invention, each of the compartments 48 are as large as is possible and practical in light of the other components of vehicle 12. In the embodiment shown in FIGS. 1 through 7, vehicle 12 has a wheel well 68 disposed in the rear cargo area 42 along the inside of sidewalls 38/40 of the bed portion 22 of vehicle 12, which is a relatively common configuration for a pickup truck type of vehicles. The wheel well 68 has a wheel well wall 70 that defines wheel well 68, as best shown in FIG. 5. As shown in this figure, the compartments 48 of the flared section 14 are located on the opposite side of the sidewalls 38/40 from the wheel well wall 70. The area between the wall 44 of fender flare 24 and the wheel well wall 70 of wheel well 68 is referred to herein as the flare space 72. As shown, the all of the compartments 48 are disposed in or at least partially disposed in the flare space 72. In the preferred embodiment, the compartments 48 utilize as much of the flare space 72 as possible so that the chambers 50 thereof will be as large as possible for transport and storage of as many tools, equipment and various other materials as desired by the user.

As stated above, the toolbox system 10 of the present invention can be utilized with virtually any type of vehicle 12 that has one or more flared sections 14 with a fender flare 24 extending outwardly from the sides 28/30 of the vehicle 12 and in spaced apart relation to one or more wheels 26. Although the drawings are directed to a dually pickup truck, the invention is not so limited. As will be readily appreciated by those skilled in the art, the toolbox system 10 can be utilized with virtually any single wheel truck or automobile that has a flared section 14 with an appropriately configured fender flare 24 and sufficient space (e.g., flare space 72) for the desired compartments 48. The toolbox system 10 of the present invention is utilized in much the same way as any prior art toolbox. The user opens one or more of the accessing means 52, such as the doors 54 and drawers 56, to place the toolbox system 10 in its open position so he or she can put the desired tools, equipment and/or other materials inside one or more of the chambers 50 within a particular compartment 48. Once the materials are in the chamber(s) 50, the user closes the accessing means 52 to place the toolbox system 10 it its closed position and, in the preferred embodiment, operates the locking mechanism (whether a separate mechanism for each compartment 4 or with a single mechanism that locks all of the compartments 48 at one time) to secure the materials inside the respective chambers 50 of the compartments 48. As with other toolbox systems, the materials inside the toolbox system 10 of the present invention can be left in the chambers 50 when the vehicle 12 is parked at a job site or at the user's home or business overnight.

While there are shown and described herein one or more specific embodiments of the invention, it will be readily apparent to those skilled in the art that the invention is not so limited, but is susceptible to various modifications and rearrangements in design and materials without departing from the spirit and scope of the invention. In particular, it should be noted that the present invention is subject to various modifications with regard to any dimensional relationships set forth herein, with regard to its assembly, size, shape and use and with regard to the materials used in its construction. For instance, there are a number of components described herein that can be replaced with equivalent functioning components to accomplish the objectives of the present invention.

What is claimed is:

1. A toolbox system, comprising:
   a vehicle having a flared section on a side of said vehicle, said flared section having a fender flare extending outwardly from an outermost sidewall on said side of said vehicle so as to dispose a wall of said fender flare in spaced apart relation to said sidewall of said vehicle, said fender flare disposed in spaced apart relation to one or more wheels of said vehicle;
   one or more compartments disposed in said flared section, each of said compartments enclosing one or more chambers therein; and
   at least one of a door and a drawer moveably associated with said fender flare and with each of said compartments to allow access to one or more of said chambers from said side of said vehicle through said wall of said fender flare.

2. The toolbox system of claim 1, wherein said flared section has at least one door that is pivotally attached to said fender flare.

3. The toolbox system of claim 1, wherein said flared section has at least one drawer that is slidably engaged with said fender flare.

4. The toolbox system of claim 1, wherein said wall of said fender flare has a wall contour shape and each of said door and said drawer has an outer member that has a member contour shape that is configured in corresponding relation to said wall contour shape.

5. The toolbox system of claim 1, wherein said vehicle has a bed portion with an upwardly disposed bed surface bounded by a front wall, a rear wall, a first sidewall and a second sidewall so as to define a rear cargo area in said bed portion, said fender flare extending outwardly from one of said first sidewall and said second sidewall, said wall of said fender flare disposed opposite from said rear cargo area so said one or more chambers are accessed from outside of said rear cargo area without said compartments extending into and interfering with said rear cargo area.

6. The toolbox system of claim 5, wherein at least one of said compartments is disposed generally below said one of said first sidewall and said second sidewall.

7. The toolbox system of claim 1, wherein said flared section defines a flare space between said wall of said fender flare and a wheel well wall of a wheel well of said vehicle, at least one of said one or more compartments disposed in said flare space.

8. The toolbox system of claim 7, wherein said vehicle has a bed portion with an upwardly disposed bed surface bounded by a front wall, rear wall, first sidewall and a second sidewall defining a rear cargo area, said wheel well disposed in rear cargo area.

9. The toolbox system of claim 1, wherein said toolbox system comprises a plurality of said compartments in said flared section.

10. The toolbox system of claim 1, wherein said flared section has at least one door that pivots downward to define a shelf.

11. A toolbox system for a vehicle having a bed portion with an upwardly disposed bed surface bounded by a front wall, a rear wall, a first outermost sidewall and a second outermost sidewall so as to define a rear cargo area, said toolbox system comprising:
   a flared section on a side of said vehicle, said flared section having a fender flare extending outwardly from one of said first sidewall and said second sidewall on said side of said vehicle so as to dispose a wall of said fender flare in spaced apart relation to said one of said first sidewall and said second sidewall of said vehicle, said fender flare disposed in spaced apart relation to one or more wheels of said vehicle;
   one or more compartments disposed in said flared section, each of said compartments enclosing one or more chambers therein; and
   at least one of a door and a drawer moveably associated with said fender flare and with each of said compartments to allow access to one or more of said chambers from said side of said vehicle outside of said rear cargo area through said wall of said fender flare without said compartments extending into and interfering with said rear cargo area, said wall of said fender flare having a wall contour shape and each of said door and said drawer having an outer member that has a member contour shape that is configured in corresponding relation to said wall contour shape.

12. The toolbox system of claim 11, wherein said flared section has at least one door that is pivotally attached to said fender flare.

13. The toolbox system of claim 11, wherein said flared section has at least one drawer that is slidably engaged with said fender flare.

14. The toolbox system of claim 11, wherein at least one of said compartments is disposed generally below said one of said first sidewall and said second sidewall.

15. The toolbox system of claim 11, wherein said flared section defines a flare space between said wall of said fender flare and a wheel well wall of a wheel well of said vehicle, at least one of said one or more compartments disposed in said flare space.

16. A toolbox for a vehicle having one or more wheels on a side of said vehicle, said toolbox comprising:
- a flared section removably attached to said vehicle, said flared section having a fender flare extending outwardly from an outermost sidewall on said side of said vehicle so as to dispose a wall of said fender flare in spaced apart relation to said sidewall of said vehicle, said fender flare disposed in spaced apart relation to said one or more wheels of said vehicle;
- one or more compartments disposed in said flared section;
- one or more chambers enclosed in each of said compartments; and
- at least one of a door and a drawer moveably associated with said fender flare and with each of said compartments to allow access to each of said one or more chambers from said side of said vehicle through said wall of said fender flare.

17. The toolbox of claim 16, wherein said fender flare has one of a door pivotally attached to said fender flare and a drawer slidably engaged with said fender flare.

18. The toolbox system of claim 16, wherein said vehicle has a bed portion with an upwardly disposed bed surface bounded by a front wall, a rear wall, a first sidewall and a second sidewall so as to define a rear cargo area in said bed portion of said vehicle, said fender flare extending outwardly from one of said first sidewall and said second sidewall without said compartments extending into and interfering with said rear cargo area.

19. The toolbox of claim 16, wherein said wall of said fender flare has a wall contour shape and each of said door and said drawer has an outer member that has a member contour shape that is configured in corresponding relation to said wall contour shape.

20. The toolbox of claim 16, wherein said flared section defines a flare space between said wall of said fender flare and a wheel well wall of a wheel well of said vehicle, at least one of said one or more compartments disposed in said flare space.

* * * * *